United States Patent Office 3,080,876
Patented Mar. 12, 1963

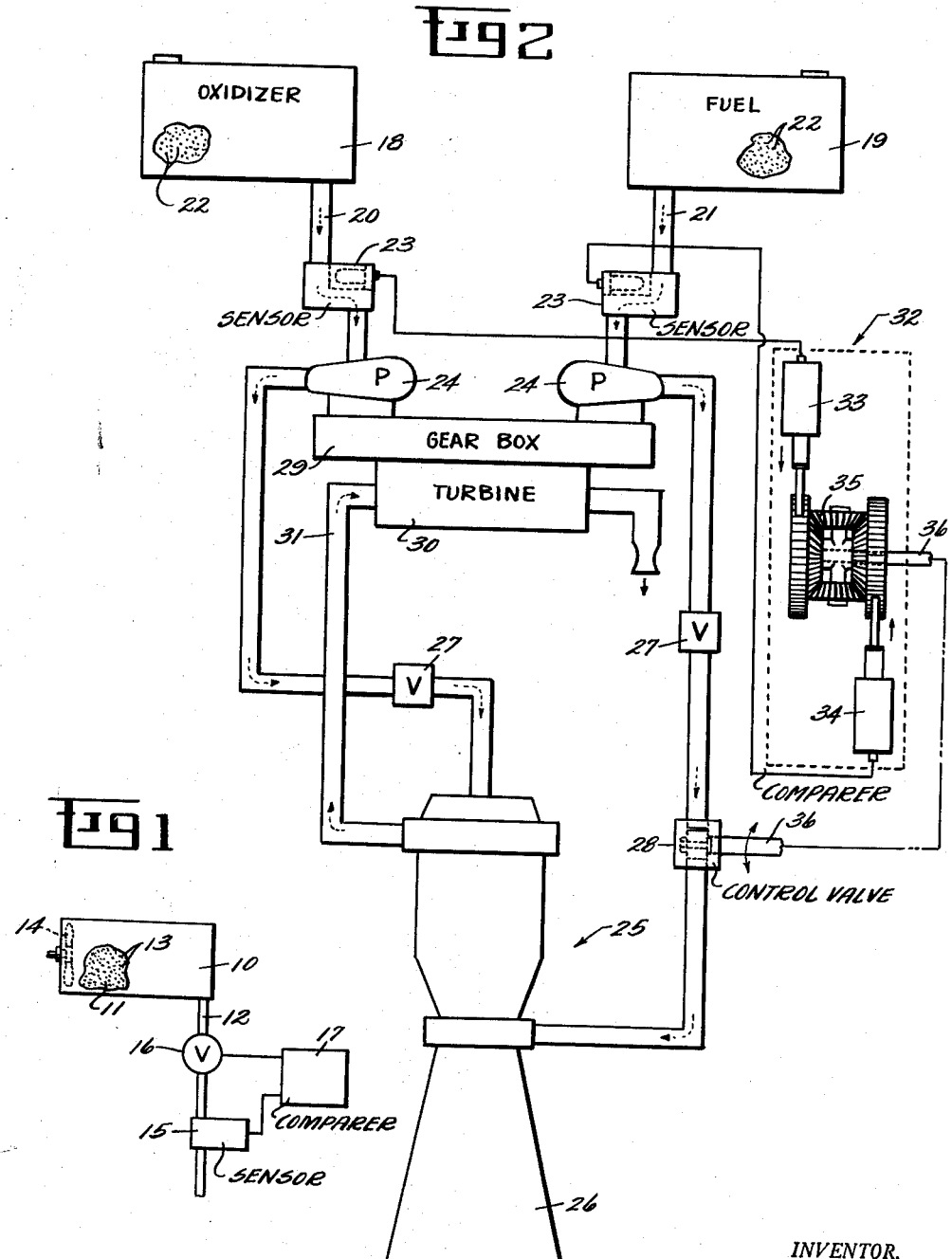

3,080,876
MEASURING DEVICE AND METHOD
Arthur P. Adamson, Cincinnati, Ohio, assignor to General
Electric Company, a corporation of New York
Filed June 29, 1959, Ser. No. 823,770
7 Claims. (Cl. 137—9)

The present invention is directed to a measuring device and method and, more particularly, to a proportion measuring device and method by which it is possible to tell, at any given time, what proportion of a fluid has been used out of a total known or known initial quantity available.

A proportion measuring device for fluids may be described as a device which at any given time, indicates the proportioned amount of fluid remaining after a quantity has been used. The normal gasoline gauge in an automobile is an example of a proportion measuring device. It differs from a flow meter which measures the rate of flow in a given device.

One of the difficulties to overcome in a proportion measuring device is to provide one which will indicate accurately when a small amount of fluid remains in the tank or receptacle. The aforementioned gasoline gauge on an automobile starts with the known capacity of the tank and measures from that point to indicate the remaining quantity at any given time. However, difficulties are encountered in providing an accurate system which can perform a similar measurement when the original quantity is unknown and is large. A device such as a flow meter that will measure satisfactorily to an error of one percent may be sufficient when the tank starts to empty, but is completely unreliable towards the end of the emptying period when small quantities remain in the tank. The advantage of a system which is not subject to this error is apparent. In addition, if the original container is of unknown or irregular shape, the difficulty of accurately measuring the quantity remaining is apparent.

A number of systems are available to determine the volume of fluid in irregular receptacles. One common means is to dissolve radio-active material in the fluid, measure the intensity of the radiation and compare it with a standard known intensity from a given volume of the fluid. A similar means is used to determine flow rate by the injection of radioactive material in a flowing fluid and sensing the time required for the radioactive fluid to move from one point to another. Even inaccessible fluids may be irradiated from without to create isotopes within and measure the travel time as stated above.

A typical application in which such measurements are desired and are critical may be found in missiles such as rockets. The efficient operation of the missile depends upon a system providing for simultaneous exhaustion of the propellants. The propellants may consist of fuel and oxidizer in separate tanks which are mixed, burned and exhausted through a nozzle to provide thrust. Any fuel or oxidizer that is left in the tank at the end of the burning period merely creates an extra pay load that is needlessly carried by the missile. For example, a missile might carry 100,000 pounds of propellants. Known systems are capable of emptying the tanks to one percent of the original amount. In this example, this would leave at least 1000 pounds of propellant unburned. If the pay load of the particular missile is 1000 pounds, it can be seen that the payload has been doubled because of the equivalent weight of unused propellant remaining in the tanks. It is therefore critical in such applications to provide an efficient propellant utilization system that is capable of controlling the flow of the propellants to the combustion system, in such a manner that the propellants are exhausted simultaneously or at least a much lower percentage remains than heretofore possible.

A number of schemes are employed in such an application including a flow type system which measures the pressure difference at the bottom of each of the tanks and compares them, thus attempting to continually detect the level of the fluid as the propellant in the tanks is used up. However, due to sloshing and boiling, the flow type system cannot provide the accuracy desired. Another system is based on the flow meter arrangement where the mass flow is detected as it leaves the tanks. This system is directed at delivering the propellants in the correct ratio. However, such a system has drawbacks since the densities of the propellants vary over wide limits. Changes in temperature during operation affect the densities of the propellants so that the system inherently may have a large error. Further, a reliance on flow meters is not too satisfactory since they themselves are not accurate to the desired degree.

In connection with the instant invention, I describe my invention in detail as directed to the simultaneous exhaustion of the propellant tanks of a rocket engine. It will be apparent, however, that the invention is equally applicable to single fluid systems of many scopes and the rocket engine application is used for illustration only. In addition, the single or mono-propellant system is described in the specification to follow.

The main object of the present invention is to disclose a measuring device and method of measuring which is highly accurate to indicate an amount of fluid remaining at any given time in a system.

A further object of the invention is to disclose a device and method of measuring that is especially adaptable to multi-propellant missile systems to permit the simultaneous exhaustion of the propellants.

A further object is to disclose such a proportion measuring system which is inherently unaffected by temperature and density changes and is independent of the container shape or the effects of sloshing and boiling.

Still another object of the invention is to disclose a measuring device and method by which a desired flow may be maintained.

Briefly stated, my invention consists in a device and method to accomplish the above objects in which a finite number of discrete particles is placed in the fluid involved to assume a random distribution. The fluid is then withdrawn and sensing means is used to sense the passage of the particles in the withdrawn fluid. By counting these particles, it is possible to determine the remaining quantity of fluid at any given time. In addition, the counting means may be used to actuate a control means, such as a valve, to correct to the desired rate of flow. By using the system in duplicate, a comparison may be kept between the two outlets and one or more may be controlled as a result of the comparison so that the two systems may be emptied simultaneously.

While the specification concludes with claims particularly pointing out and distinctly claiming the subject matter which I regard as my invention, it is believed the invention will be better understood from the following description taken in connection with the accompanying drawing in which:

FIGURE 1 is a diagrammatic showing of a mono-fluid system illustrating the present invention; and, FIGURE 2 is a diagrammatic showing of a dual-fluid or missile propellant system illustrating the invention.

Referring first to FIGURE 1, the diagrammatic system is shown for the control of a single fluid, in accordance with the invention. This system comprises a receptacle 10 for the storage of fluid 11 therein. It is important to note that the particular shape or volume of receptacle 10 is unimportant in the present invention. While it is shown as rectangular, it will be appreciated that it may be any unknown shape such as aircraft wing tanks. Fluid may be withdrawn from receptacle 10 by means of an outlet 12 which comprises a pipe or any suitable means of removing fluid from receptacle 10. In order to provide something which may be measured, fluid 11 has dispersed therein a finite number of discrete particles 13 which may take any suitable form. The particles must be discernible and therefore may be radioactive particles, fluorescent particles, or even possibly a magnetically, electrically, or optically detectable particle. The particular material of the particle is unimportant since the essence of the invention is in providing a finite or known number of the particles and making each and every particle discrete so that it can be sensed and counted as will be apparent below. The discrete particles 13 are given a random distribution merely by the law of averages. In addition, they may be stirred into the fluid by some suitable means 14 to insure the random distribution. It is not necessary to have a uniform distribution but a random distribution like dust particles in the air. Statistically, this will take care of any variation due to the randomness and provide for a small error, whose most probable magnitude can be predetermined. The larger the number of particles used, the smaller the error.

In order to determine the amount of fluid in receptacle 10 at any given time, a sensing means 15 is provided in the outlet to detect the passage of the particles. In this sense, "outlet" means any conduit or the like through which the fluid passes. Sensing means 15 may take any suitable form that is able to sense discrete particles and will depend on the particular particle that is used. For example, if a fluorescent particle is used, the sensing means 15 may adequately be a photocell to detect the flash of light as the particle passes through an irradiating energy beam. In addition, sensing means 15 may also count the particles or separate means may be used to count the particles. In order to maintain the desired flow from receptacle 10, control means 16, such as a valve, may be placed in the outlet. To perform the proper adjustment, the impulses detected by sensing means 15 may be transmitted to a comparing means 17 which can compare to a standard and in turn operate control means 16. In a simple operation, comparing means 17 may have a pre-set value so that if sensing means 15 indicates too many particles are passing, comparing means 17 will shut down control 16 to decrease the rate of flow. On the other hand, if too few are passing compared to the standard, control 16 may be opened to increase the flow. Comparing means 17 may also take any suitable form depending upon the particular application and may include electronic, hydraulic, or plain mechanical mechanisms for comparing and adjusting.

It can be seen in the previous discussion, that the system and method employed to measure the proportion of fluid remaining in receptacle 10, is relatively simple and highly accurate. It may be used to control fluid flow from any irregular source and a source of fluid of an unknown quantity to a highly accurate degree.

Referring next to FIGURE 2, I have illustrated a dual propellant system for a rocket engine. While shown as a dual propellant, it will be apparent that a plurality of fluids may be employed in addition to the two liquids shown in FIGURE 2, and the discussion to follow is equally applicable no matter how many fluids of the same or different types are employed. The system of FIGURE 2 comprises an oxidizer receptacle 18, fuel receptacle 19, each having outlets 20 and 21 respectively. To provide a standard from which to start, the finite discrete particles 22 are dispersed throughout both liquids. At this point it should be noted that particles 22 in receptacles 18 and 19 may be the same or they may be different. In addition, it may be necessary to match the density of the particles rather closely, within limits, to the fluid so that the individual particles do not float or sink but assume positions of random distribution which, statistically, will provide for uniform distribution throughout the whole mass of the fluid.

In order to detect the passage of the particles in the withdrawn fluid, suitable sensing means 23, which may take the form of a photocell, is provided in each outlet. The particular fluids in the illustrated application, then pass through pumps 24 which direct the fluids under pressure to the rocket motor in a conventional manner as generally illustrated at 25. In the rocket motor, of course, the fluids are mixed and burned to produce thrust in the direction shown by the arrow exiting from nozzle 26. In order to initiate the flow, suitable start and stop valves 27 may be employed in each fluid line.

As the propellants are used, in order to insure a simultaneous exhaustion of the propellants, control means 28 is inserted in at least one of the lines as shown to increase or decrease the flow of fluid through that line. Control means 28 may have any suitable form such as a valve which controls the flow by pressure drop across the valve. Pumps 24 may be driven by gear box 29 which, in turn, is driven by turbine 30 operating on exhaust gases passing through line 31 from the combustion chamber of the rocket motor.

In order to compare and thus make suitable adjustments, a comparing means generally indicated at 32 is illustrated. This illustration shows a mechanical comparing means although other equivalent means will be suitable. As shown, comparing means 32 may comprise ratchet mechanisms 33 and 34, actuated by sensors 23, as a result of the detection of particles passing the sensors. A mechanical differential 35 may be used to operate shaft 36 which, is connected directly to the control means 28. Thus, it can be seen that if ratchets 33 and 34 move as each particle passes, as long as the same number of particles pass sensing means 23, shaft 36 will remain still. Thus, the rate of flow is equal from both tanks. However, if one gets ahead as indicated by the count of particles, shaft 36 will turn one way to adjust controlling means 28 to speed up or slow down the flow of fuel into motor 25. Thus the comparing means 32 also acts as a counter in the illustrated embodiment.

By counting particles, regardless of the size or shape of the receptacle or the quantity of fluid therein, it is possible to measure to a very high degree of accuracy the proportion of the fluid that is still left in the receptacle after some of it has been withdrawn. It will be apparent that this degree of accuracy gets very high as a receptacle becomes almost empty, which, in an application such as that illustrated in FIGURE 2, is the time that it is desirable to have a very accurate reading; i.e., when we get down to only a few particles out of perhaps hundreds of thousands. Whereas a flow meter may tell the flow rate quite nicely, its approximately one percent error is large at the time little fluid remains in the tank, which is the critical period. The use of a particle count and subsequent adjustment does not have the characteristic of becoming progressively less accurate as the receptacle empties, thus giving a high degree of accurate measurement of what is left in the receptacle at any given time.

In operation, the embodiment illustrated in FIGURE 2 directs liquid from both tanks or receptacles 18 and 19 through the outlets and sensing means 23 and on into the rocket motor where they are burned to produce thrust. Sensing means 23 senses the passage of each finite and discrete particle which is distributed throughout the liquids. The sensing means 23 in turn, operates comparing means 32 which, by the ratchet mechanisms, operates a control means 28 to adjust accordingly. By knowing the number of particles which are disposed in the receptacles 18 and 19, it is possible at any given time by means of the device and method shown, to determine very accurately the amount of fluid left in each receptacle and to adjust accordingly to provide for simultaneous exhaustion in the case of the missile application. In the case of the application shown in FIGURE 1, it is possible to adjust to any desired rate or to determine the remaining fluid in tank 10 at any given time.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. The method of measuring the quantity of fluid used out of a total available comprising the steps of, placing in said total available fluid a finite number of discrete particles in random distribution therein, drawing off said fluid through an outlet, and sensing the number of discrete particles in the drawn off fluid as a measure of the remaining fluid.

2. The method described in claim 1 wherein the fluid is stirred after deposition of said particles to insure a random distribution of said particles.

3. A proportion measuring device comprising a plurality of separate fluid receptacles, a fluid in each receptacle, a finite number of discrete particles dispersed in each fluid, each receptacle having an outlet for the fluid therein, sensing means connected to each outlet to sense the passage of the particles thereby, flow control means in at least one of said outlets, and means connected to said control means and connected to and operative by said sensing means to compare the number of particles sensed and adjust said control means for a desired flow from said controlled outlets.

4. A proportion measuring device comprising, a pair of separate fluid receptacles, a dissimilar fluid in each receptacle, a finite number of discrete particles compatible with and randomly dispersed in each fluid, each receptacle having an outlet for the fluid therein, sensing means connected to each outlet to sense the passage of the particles thereby, flow control means in one of said outlets, and means connected to said control means and connected to and operative by said sensing means to compare the number of particles sensed and adjust said control means for a desired flow to exhaust said fluid receptacles simultaneously.

5. The method of exhausting a plurality of fluid containing receptacles in a desired manner comprising the steps of, introducing a finite number of discrete particles to the fluids in a random distribution therein, drawing off said fluids from the receptacles, sensing and counting the particles in the drawn off fluids, comparing the number of withdrawn particles from each receptacle, and adjusting the rate of withdrawal as a result of the comparison so that the receptacles are exhausted in a desired manner.

6. The method of claim 5 wherein the fluids are further subjected to stirring to insure random dispersal of the particles therein.

7. A proportion measuring device comprising, a receptacle, a fluid therein, a finite number of discrete particles dispersed in said fluid, said receptacle having an outlet for the fluid, sensing means connected to said outlet for detecting the passage of the particles thereby, and flow control means in said outlet connected to and actuated by said sensing means.

References Cited in the file of this patent

UNITED STATES PATENTS

| | | |
|---|---|---|
| 2,772,561 | Plank et al. | Dec. 4, 1956 |
| 2,826,699 | Hull | Mar. 11, 1958 |
| 2,909,303 | Henderson et al. | Oct. 20, 1959 |